(12) United States Patent
Grantham et al.

(10) Patent No.: US 12,522,145 B2
(45) Date of Patent: Jan. 13, 2026

(54) VEHICLES INCLUDING FRANGIBLE STORAGE COMPARTMENT SEALING DEVICES

(71) Applicant: Toyota Motor Engineering & Manufacturing North America, Inc., Plano, TX (US)

(72) Inventors: Troy N. Grantham, Saline, MI (US); Haley L. Grantham, Saline, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 514 days.

(21) Appl. No.: 18/182,551

(22) Filed: Mar. 13, 2023

(65) Prior Publication Data

US 2024/0308429 A1 Sep. 19, 2024

(51) Int. Cl.
| | |
|---|---|
| *B60R 5/02* | (2006.01) |
| *B62D 25/08* | (2006.01) |
| *B62D 25/10* | (2006.01) |
| *B62D 25/12* | (2006.01) |
| *B60R 21/00* | (2006.01) |
| *F16J 15/06* | (2006.01) |

(52) U.S. Cl.
CPC ............. *B60R 5/02* (2013.01); *B62D 25/087* (2013.01); *B62D 25/105* (2013.01); *B62D 25/12* (2013.01); *B60R 2021/0004* (2013.01); *B60R 2021/0025* (2013.01); *F16J 15/06* (2013.01)

(58) Field of Classification Search
CPC . B60R 5/02; B60R 2021/0004; B62D 25/087; B62D 25/12; B62D 25/105
USPC ....................................... 296/187.04, 193.11
See application file for complete search history.

(56) References Cited

U.S. PATENT DOCUMENTS

| | | | |
|---|---|---|---|
| 6,840,659 B2 | 1/2005 | Brown et al. | |
| 7,413,239 B2 * | 8/2008 | Mitsuyama | B62D 25/163 296/187.04 |
| 7,611,192 B2 * | 11/2009 | Takei | B62D 25/081 296/193.11 |
| 7,690,722 B2 | 4/2010 | Boggess | |
| 8,702,155 B2 * | 4/2014 | Suzuki | B62D 25/081 D12/91 |
| 8,720,975 B1 | 5/2014 | Perez et al. | |
| 8,807,637 B2 * | 8/2014 | Partsch | B60J 10/24 296/193.11 |
| 8,870,271 B2 * | 10/2014 | Ellison | B62D 25/081 296/193.11 |
| 9,527,450 B1 * | 12/2016 | Bellis | B62D 25/082 |

(Continued)

FOREIGN PATENT DOCUMENTS

| | | | |
|---|---|---|---|
| CN | 210212310 U | * | 3/2020 |
| CN | 216069870 U | * | 3/2022 |

(Continued)

*Primary Examiner* — Jason S Morrow
(74) *Attorney, Agent, or Firm* — Dinsmore & Shohl LLP

(57) ABSTRACT

A vehicle includes a vehicle frame member, a storage compartment, and a sealing device coupling the storage compartment to the vehicle frame member. At least a portion of the sealing device is configured to move in a downward vehicle vertical direction upon a force exceeding a predetermined threshold being applied against an upper end of the sealing device.

16 Claims, 4 Drawing Sheets

(56) References Cited

U.S. PATENT DOCUMENTS

| | | | |
|---|---|---|---|
| 9,725,121 B2* | 8/2017 | Kaba | B60R 21/34 |
| 9,849,917 B2* | 12/2017 | Ishihara | B62D 25/081 |
| 11,492,049 B2 | 11/2022 | Rahman et al. | |
| 2013/0076076 A1* | 3/2013 | Partsch | B60J 10/24 |
| | | | 296/193.11 |
| 2015/0035318 A1* | 2/2015 | Serizawa | B62D 25/081 |
| | | | 296/192 |
| 2020/0262482 A1* | 8/2020 | Makowski | B62D 25/12 |
| 2022/0228404 A1 | 7/2022 | Klein | |
| 2022/0371519 A1 | 11/2022 | Weber | |

FOREIGN PATENT DOCUMENTS

| | | | |
|---|---|---|---|
| CN | 216684284 U | 6/2022 | |
| DE | 2711339 C3 | 9/1979 | |
| JP | 2002240738 A * | 8/2002 | |
| JP | 2004345544 A * | 12/2004 | |
| WO | WO-2021094093 A1 * | 5/2021 | B60R 21/34 |

* cited by examiner

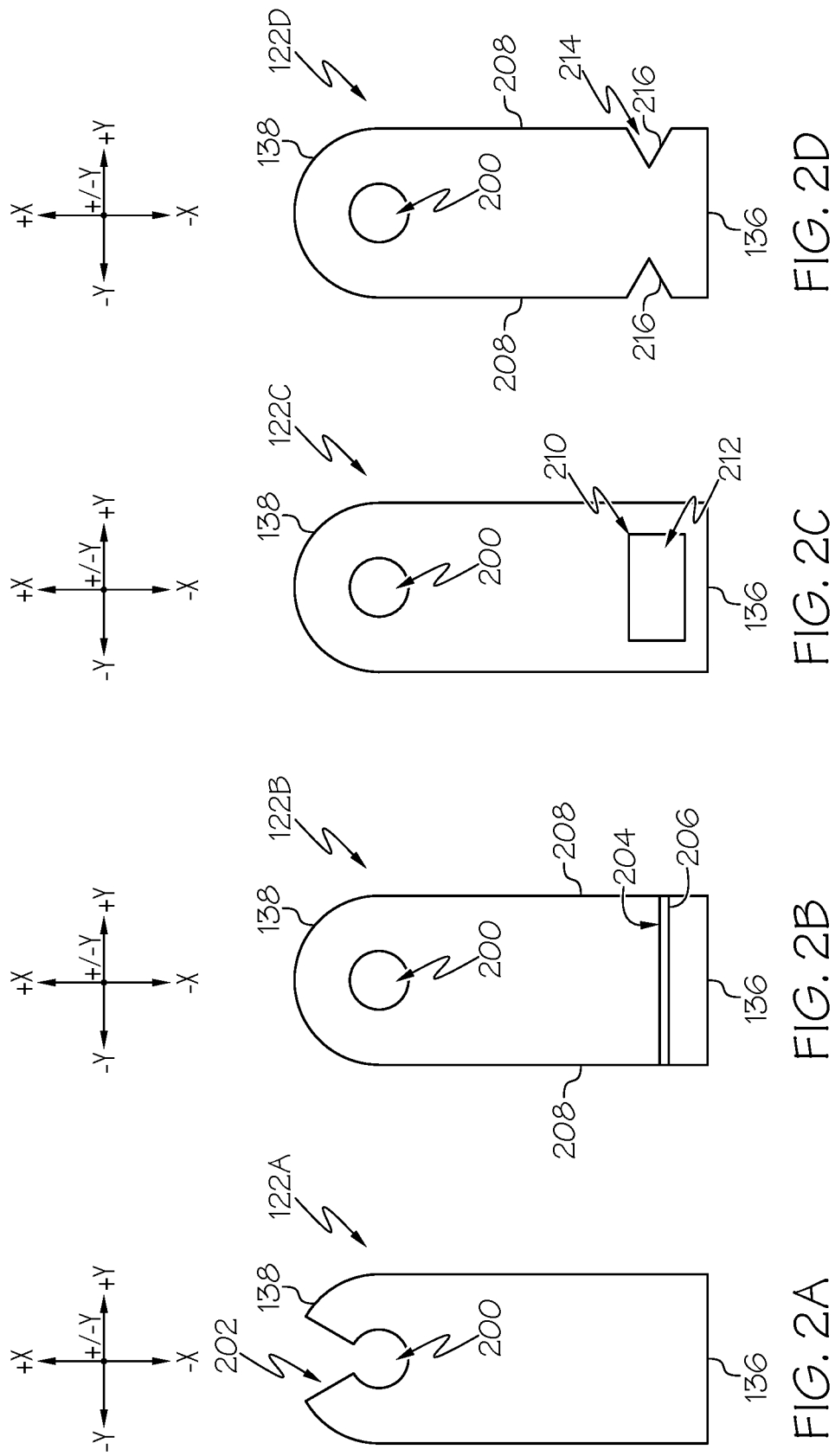

VEHICLES INCLUDING FRANGIBLE STORAGE COMPARTMENT SEALING DEVICES

TECHNICAL FIELD

The present specification generally relates to sealing devices for vehicle storage compartments and, more specifically, sealing devices that reduce an impact force against an object impacting a vehicle body member while maintaining a fluid seal with a vehicle storage compartment.

BACKGROUND

During an object to vehicle impact, the object may strike the vehicle hood. Contact with under-hood vehicle components such as vehicle frame, vehicle engine, engine components, metal/plastic brackets, or in the case of new battery electric vehicles, the vehicle frunk trunk or "frunk" structure can increase impact force to the object. To minimize the impact force to the object, it is necessary for these components to "deform" during impact to avoid large changes in accelerations during contact.

A typical frunk enclosure is a rigid, waterproof enclosed structure that varies in volume depending on a size of the vehicle. In current market vehicles, there is a rigid sealing surface that seals to the underside of the vehicle hood. However, in the case of an impact with an object, if these structures are too rigid, unyielding, and un-deformable, it can increase the impact to the object. Vehicles in the current market prioritize water sealing and do not include measures to mitigate impact forces. Accordingly, a need exists for improved sealing devices that include measures to mitigate impact forces during an object to vehicle impact event.

SUMMARY

In one embodiment, a vehicle includes a vehicle frame member, a storage compartment, and a sealing device coupling the storage compartment to the vehicle frame member. At least a portion of the sealing device is configured to move in a downward vehicle vertical direction upon a force exceeding a predetermined threshold being applied against an upper end of the sealing device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2A schematically depicts a top view of an extension member of the sealing device of FIG. 1, according to one or more embodiments shown and described herein;

FIG. 2B schematically depicts a top view of another extension member of the sealing device of FIG. 1, according to one or more embodiments shown and described herein;

FIG. 2C schematically depicts a top view of another extension member of the sealing device of FIG. 1, according to one or more embodiments shown and described herein;

FIG. 2D schematically depicts a top view of another extension member of the sealing device of FIG. 1, according to one or more embodiments shown and described herein;

DETAILED DESCRIPTION

Figure 1A:
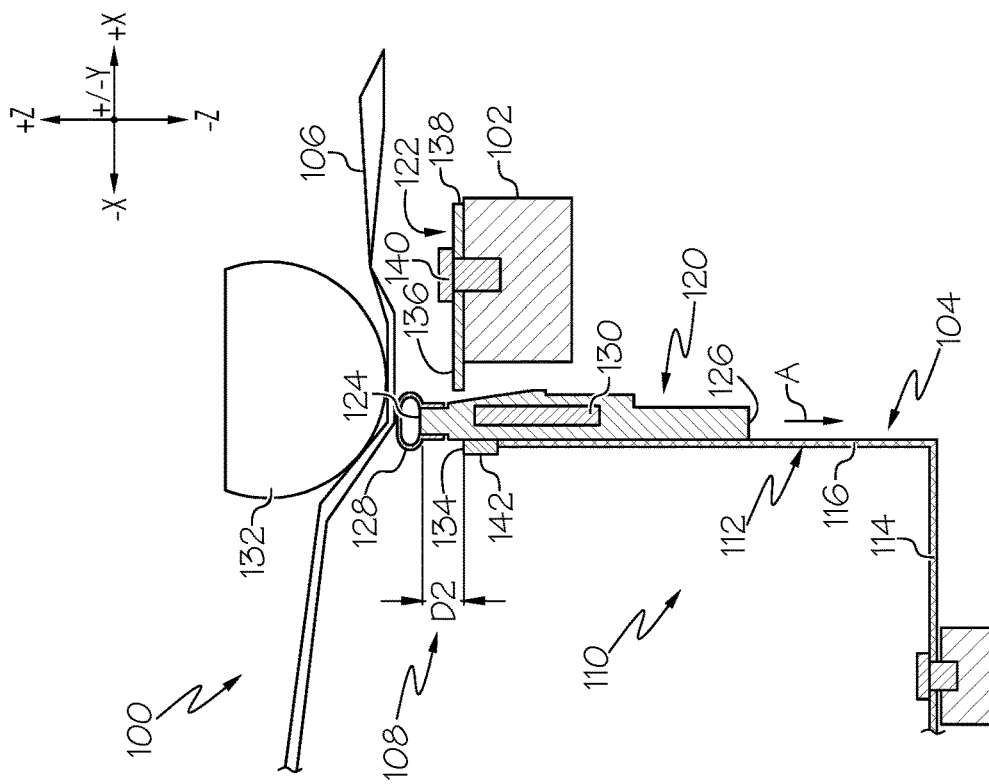
FIG. 1A schematically depicts a partial cross-sectional view of a vehicle including an embodiment of a sealing device in a pre-collision state prior to a collision event, according to one or more embodiments shown and described herein.

Embodiments described herein are directed to vehicles including sealing devices provided between a storage compartment of the vehicle and a vehicle body member. The sealing devices couple the storage compartment to a vehicle frame member. At least a portion of the sealing device is configured to move in a downward vehicle vertical direction upon a force exceeding a threshold being applied against an upper end of the sealing device. Various embodiments of the sealing devices and the operation of the sealing devices are described in more detail herein. Whenever possible, the same reference numerals will be used throughout the drawings to refer to the same or like parts.

As used herein, the term "vehicle longitudinal direction" refers to the forward-rearward direction of the vehicle (i.e., in the +/−Y direction of the coordinate axes depicted in FIG. 1A). The term "vehicle lateral direction" refers to the cross-vehicle direction (i.e., in the +/−X direction of the coordinate axes depicted in FIG. 1A), and is transverse to the vehicle longitudinal direction. The term "vehicle vertical direction" refers to the upward-downward direction of the vehicle (i.e., in the +/−Z direction of the coordinate axes depicted in FIG. 1A). As used herein, "upper", "upward", and "above" are defined as the positive Z direction of the coordinate axes shown in the drawings. "Lower", "downward", and "below" are defined as the negative Z direction of the coordinate axes shown in the drawings. Further, the terms "outboard" or "outward" as used herein refers to the relative location of a component with respect to a vehicle centerline. The term "inboard" or "inward" as used herein refers to the relative location of a component with respect to the vehicle centerline. Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle.

Referring now to FIG. 1A, a vehicle 100 is illustrated according to one or more embodiments described herein. The vehicle 100 may generally include a vehicle frame member 102, a storage compartment 104, a vehicle body member 106, and a sealing device 108. The vehicle body member 106 is provided above the vehicle frame member 102 and the storage compartment 104 in the vehicle vertical direction. The sealing device 108 couples the storage compartment 104 to the vehicle frame member 102. In embodiments, the storage compartment 104 may be provided at either a rear end or a front end of the vehicle 100. For example, when provided at the front end of the vehicle 100, the storage compartment 104 may be a front trunk, also referred to as a frunk, of the vehicle 100. In embodiments in which the storage compartment 104 is a frunk, the vehicle body member 106 provided above the frunk may be a hood of the vehicle 100. The vehicle body member 106 is movable between an open position, as shown in FIG. 1A, to permit access to an interior 110 of the storage compartment 104, and a closed position to inhibit access to the interior 110 of the storage compartment 104.

The storage compartment 104 includes a storage compartment housing 112 that defines the interior 110 of the storage compartment 104. The storage compartment housing 112 includes a bottom wall 114 and at least one side wall 116 extending outwardly from the bottom wall 114. However, it should be appreciated that the storage compartment housing 112 may include two pairs of opposing side walls 116.

As shown, the bottom wall 114 is fixed to a support member 120 so as to fix the storage compartment 104 within the vehicle 100. Although the support member 120 is shown separate from the vehicle frame member 102, in embodiments, the support member 120 may be formed as a one piece, monolithic structure with the vehicle frame member 102 such that the storage compartment 104 does not move relative to the vehicle frame member 102.

Referring still to FIG. 1A, the sealing device 108 includes a frangible portion 120 and an extension portion 122 extending from the frangible portion 120. More specifically, the frangible portion 120 has an upper end 124 and a lower end 126 opposite the upper end 124. The sealing device 108 includes a seal 128, such as a bulb seal, provided at the upper end 124 of the frangible portion 120. The seal 128 may be formed from any suitable material, for example, an elastomeric material, to conform to a gap defined between the upper end 124 of the frangible portion 120 and the vehicle body member 106. Accordingly, the seal 128 inhibits fluid, such as rainwater, from flowing between the sealing device 108 and the vehicle body member 106. The engagement of the seal 128 and the vehicle body member 106 inhibits debris and fluid from entering the interior 110 of the storage compartment 104.

In embodiments, the frangible portion 120 includes an inner reinforcement member 130 encased within the frangible portion 120. The inner reinforcement member 130 may include at least one of a metal reinforcement, a fiberglass reinforcement, or any other suitable reinforcement to reinforce a structural integrity of the frangible portion 120. In some embodiments, the inner reinforcement member 130 is formed from a material different from a material forming the frangible portion 120. In some embodiments, a height of the inner reinforcement member 130 extending along the vehicle vertical axis is greater than a thickness of the inner reinforcement member 130 extending along a direction transverse to the vehicle vertical axis.

Figure 1B:
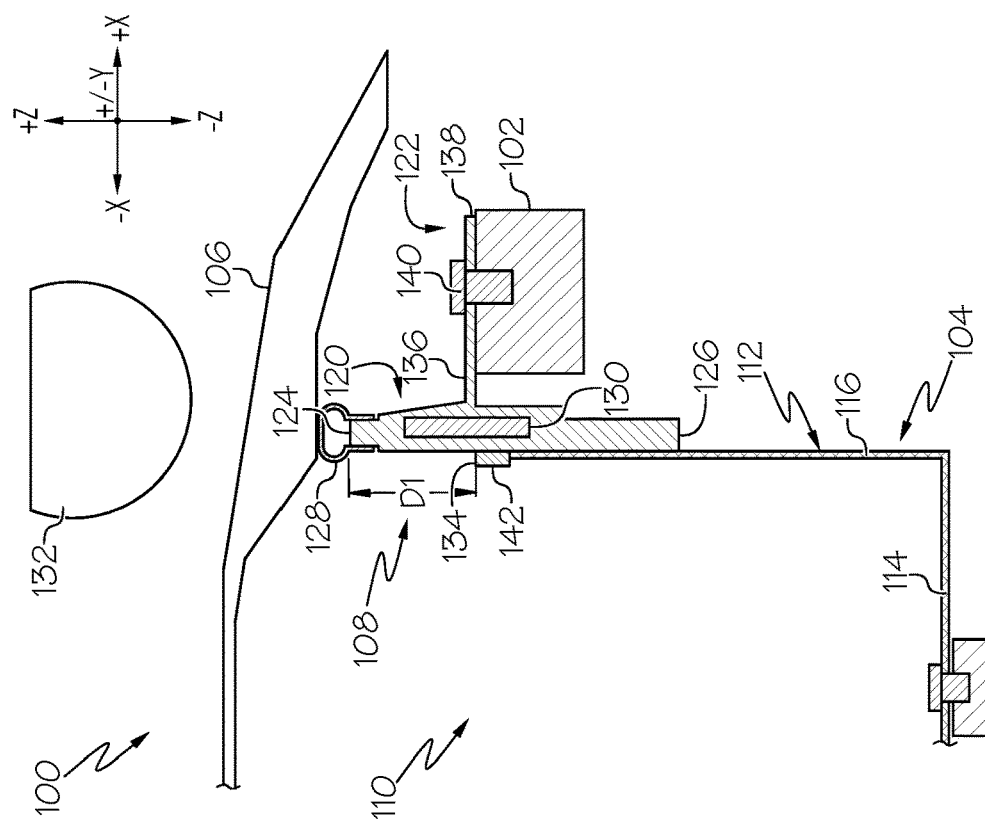
FIG. 1B schematically depicts a partial cross-sectional view of the vehicle of FIG. 1A including the sealing device in a collision state after a collision event, according to one or more embodiments shown and described herein.

As shown in FIG. 1A, prior to a collision event with an object 132 impacting the vehicle body member 106, the sealing device 108 is in a pre-collision state and the upper end 124 of the frangible portion 120 is located at a distance D1 from an upper end 134 of the storage compartment 104. In the pre-collision state, the extension portion 122 extends from the frangible portion 120. However, as discussed in more detail herein, in a collision state as shown in FIG. 1B, the extension portion 122 either sheers from the frangible portion 120 or disengages the vehicle frame member 102. The frangible portion 120 is displaced downwardly in the vehicle vertical direction due to the impact force of the object 132. A distance D2 between the upper end 124 of the frangible portion 120 and the upper end 134 of the storage compartment 104 in the collision state is less than the distance D1 in the pre-collision state (FIG. 1A). In some embodiments, the object 132 may be a pedestrian, such as a head of a pedestrian.

The extension portion 122 has a proximal end 136 and a distal end 138 opposite the proximal end 136. The proximal end 136 of the extension portion 122 is fixed to the frangible portion 120 and the extension portion 122 is coupled to the vehicle frame member 102 at the distal end 138. In embodiments, the vehicle frame member 102 includes a fastener 140. The distal end 138 of the extension portion 122 engages the fastener 140 to couple the extension portion 122 to the vehicle frame member 102.

In embodiments, the sealing device 108 is removably attached to the storage compartment 104. In other embodiments, a sealing device attachment frame 142 is provided at the upper end 134 of the storage compartment 104. The sealing device 108, specifically the frangible portion 120, is removably attached to the sealing device attachment frame 142. The sealing device attachment frame 142 may extend along an entire perimeter of the storage compartment 104 and a plurality of sealing devices 108 may be removably attached to the sealing device attachment frame 142 at spaced apart intervals from one another. Upon the collision event, as described in more detail herein, the frangible portion 120 of one or more of the sealing devices 108 impacted by a downward force of the object 132 via the vehicle body member 106 may detach from the sealing device attachment frame 142 to dampen the impact force on the object 132 imparted by the vehicle body member 106.

As shown in FIG. 1B, during the collision event in which the object 132 impacts the vehicle body member 106 and applies a force in a downward vehicle vertical direction, the vehicle body member 106 transmits the downward force against the seal 128 and the upper end 124 of the frangible portion 120 such that the frangible portion 120 moves in a direction of arrow A. In embodiments, the frangible portion 120 is slidably coupled to the storage compartment 104 such that the frangible portion 120 is permitted to move in the downward vehicle vertical direction during the collision event, yet remain coupled to the sealing device attachment frame 142, when provided, or the storage compartment 104 when the sealing device attachment frame 142 is not provided. In other embodiments, the frangible portion 120 may completely detach from the sealing device attachment frame 142 or the storage compartment 104.

Referring still to FIG. 1B, as the frangible portion 120 moves in the downward vehicle vertical direction, the frangible portion 120 shears from the extension portion 122, which remains coupled to the vehicle frame member 102 via the fastener 140. By permitting the frangible portion 120 to move in the downward vehicle vertical direction, the object 132 is permitted to travel a greater stroke as the vehicle body member 106 is permitted to deform a greater amount as compared to embodiments in which the frangible portion 120 remains fixed relative to the storage compartment 104 and prevents additional deformation of the vehicle body member 106. This allows the impact force against the object 132 to be dampened.

Referring now to FIGS. 2A-2D, various embodiments of the extension portion 122 are depicted. Although it is discussed herein that the frangible portion 120 shears from the extension portion 122 during the collision event and the extension portion 122 remains coupled to the vehicle frame member 102, it should be appreciated that, in some embodiments, the extension portion 122 itself may disengage the vehicle frame member 102 during movement of the frangible portion 120 in the downward vehicle vertical direction, and the extension portion 122 remains coupled to the frangible portion 120 during the downward movement of the frangible portion 120.

For example, as shown in FIG. 2A, an extension portion 122A is depicted including a hole 200 for receiving the fastener 140 (FIG. 1A) and an open-ended cutout 202 formed in the distal end 138 of the extension portion 122A and in communication with the hole 200. The open-ended cutout 202 is tapered in a direction toward the proximal end 136 of the extension portion 122A and tuned to permit the extension portion 122A to disengage the fastener 140 upon a force exceeding a predetermined threshold being applied to the upper end 124 of the frangible portion 120 (FIG. 1A) in the downward vehicle vertical direction. Specifically, the open-ended cutout 202 permits the fastener 140 to disengage from the hole 200 through the open-ended cutout 202 without fracturing the extension portion 122A.

Referring to FIG. 2B, an extension portion 122B is depicted including a frangible or weakened portion 204 formed closer to the proximal end 136 than the distal end 138 of the extension portion 122B. The weakened portion 204 includes a groove 206 extending in a lateral direction between opposite sides 208 of the extension portion 122. The weakened portion 204 permits the extension portion 122B to break at the groove 206 upon a force exceeding a predetermined threshold being applied to the upper end 124 of the frangible portion 120 (FIG. 1A) in the downward vehicle vertical direction.

In FIG. 2C, an extension portion 122C is depicted including a frangible or weakened portion 210 defining an opening 212 formed in the extension portion 122C closer to the proximal end 136 than the distal end 138 of the extension portion 122C. The opening 212 may extend entirely or only partially through the extension portion 122C. The weakened portion 210 permits the extension portion 122C to break at the opening 212 upon a force exceeding a predetermined threshold being applied to the upper end 124 of the frangible portion 120 (FIG. 1A) in the downward vehicle vertical direction. Although the opening 212 is depicted herein as having a rectangular shape, it should be appreciated that the opening 212 may have any other suitable regular or non-regular geometry and size other than that depicted herein such as, for example, circular, elliptical, square, and the like.

In FIG. 2D, an extension portion 122D is depicted including a frangible or weakened portion 214 defining at least one notch 216 formed in at least one side 208 of the extension portion 122D closer to the proximal end 136 than the distal end 138 of the extension portion 122D. In embodiments, as shown, the weakened portion 214 may include a pair of notches 216 formed in opposite sides 208 of the extension portion 122D. The weakened portions 214 permit the extension portion 122D to break at a location between the notches 216 upon a force exceeding a predetermined threshold being applied to the upper end 124 of the frangible portion 120 (FIG. 1A) in the downward vehicle vertical direction. Although the notches 216 are depicted herein as having a wedge shape, it should be appreciated that the notches 216 may have any other suitable regular or non-regular geometry and size other than that depicted herein such as, for example, rectangular, semicircular, and the like.

Figure 3A:
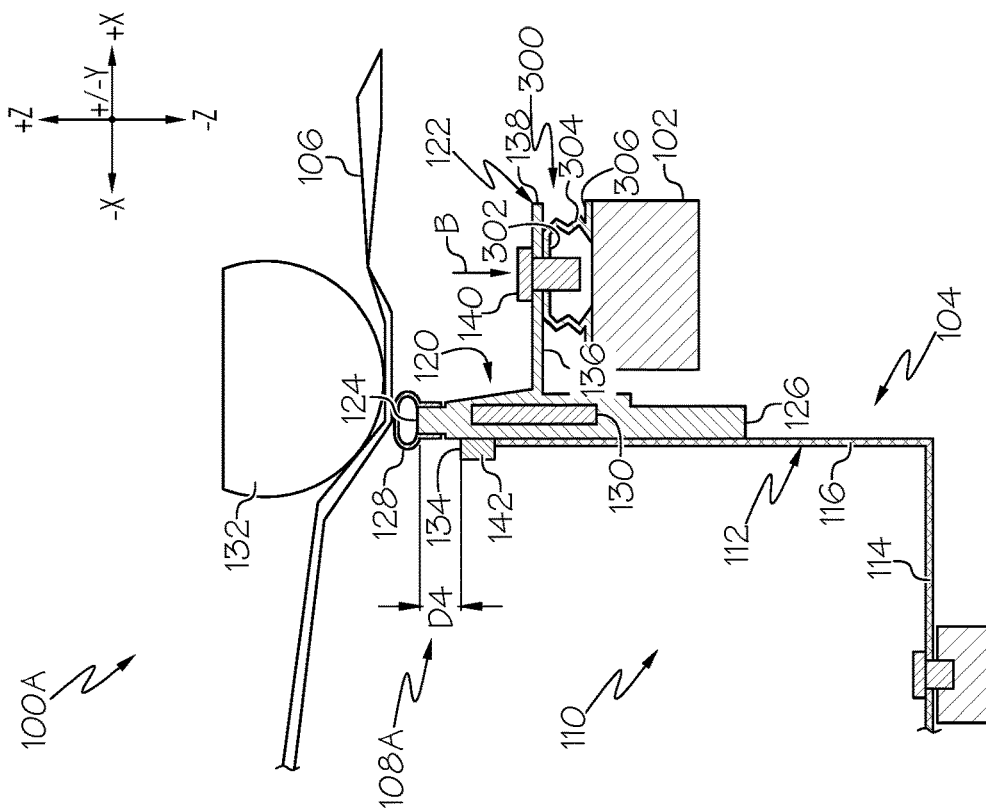
FIG. 3A schematically depicts a partial cross-sectional view of a vehicle including another embodiment of a sealing device in a pre-collision state prior to a collision event, according to one or more embodiments shown and described herein.

Referring now to FIG. 3A, a vehicle 100A is depicted including another embodiment of a sealing device 108A. It should be appreciated that the sealing device 108A is similar to the sealing device 108 (FIG. 1A) discussed herein and, therefore, like reference numbers will be used herein to refer to like parts. Rather than the frangible portion 120 shearing from the extension portion 122 during a collision event, as discussed above with respect to the sealing device 108, a bracket 300 is provided on the vehicle frame member 102. The extension portion 122 is coupled to the bracket 300 via the fastener 140. The bracket 300 includes an upper wall 302, at least one leg 304 extending from the upper wall 302, and a foot 306 provided at an end of the leg 304 opposite the upper wall 302.

Figure 3B:
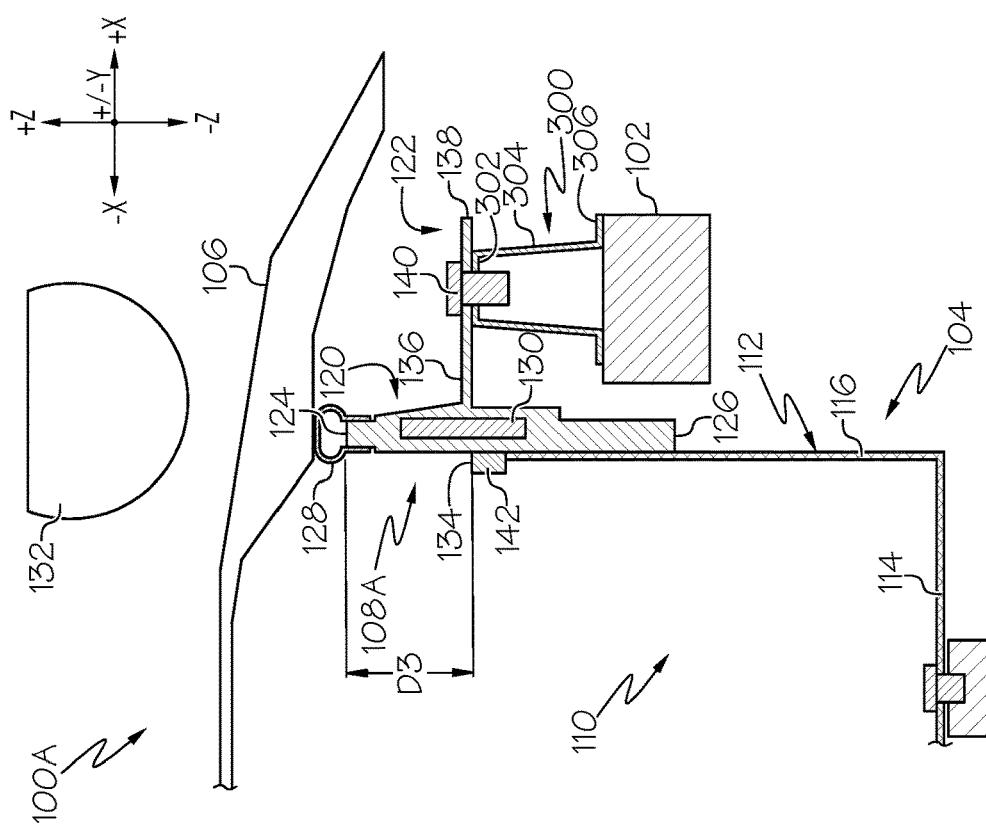
FIG. 3B schematically depicts a partial cross-sectional view of the vehicle of FIG. 3A including the sealing device in a collision state after a collision event, according to one or more embodiments shown and described herein.

Prior to a collision event, with the sealing device 108A in a pre-collision state, the extension portion 122 is spaced apart from the vehicle frame member 102 by a distance D3. As shown in FIG. 3B, after the collision event in which the object 132 applies a force against the upper end 124 of the frangible portion 120 of the sealing device 108A in the downward vehicle vertical direction, the leg 304 of the bracket 300 compresses and the upper wall 302 moves in a direction of arrow B such that a distance D4 between the extension portion 122 and the vehicle frame member 102 is less than the distance D3 (FIG. 3A). Accordingly, the extension portion 122, which is fixed to the upper wall 302 of the bracket 300 via the fastener 140 draws the sealing device 108A in the downward vehicle vertical direction. After the collision event, the bracket 300 may be replaced with a new bracket to allow the sealing device 108A to be reused.

Figure 4A:
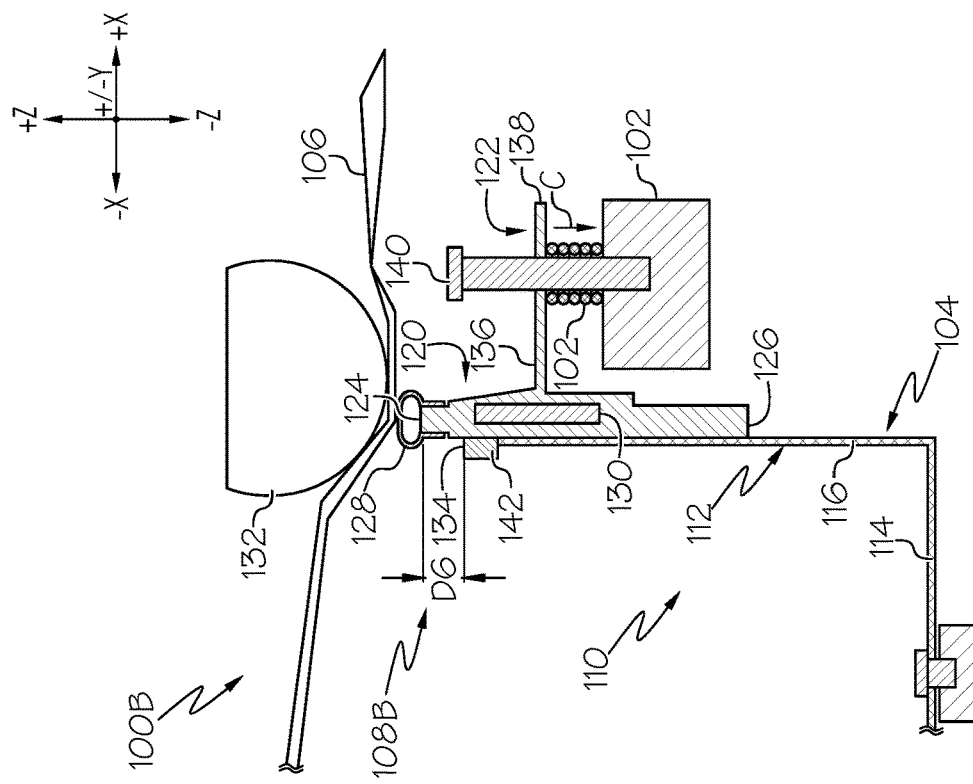
FIG. 4A schematically depicts a partial cross-sectional view of a vehicle including another embodiment of a sealing device in a pre-collision state prior to a collision event, according to one or more embodiments shown and described herein.

Referring now to FIG. 4A, a vehicle 100B is depicted including another embodiment of a sealing device 108B. It should be appreciated that the sealing device 108B is similar to the sealing device 108 (FIG. 1A) discussed herein and, therefore, like reference numbers will be used herein to refer to like parts. Rather than the frangible portion 120 shearing from the extension portion 122 during a collision event, as discussed above with respect to the sealing device 108 (FIG. 1A), a biasing member 400 is provided between the extension portion 122 and the vehicle frame member 102 to bias the extension portion 122 away from the vehicle frame member 102. In some embodiments, the biasing member 400 is provided coaxial with the fastener 140, which slidably couples the sealing device 108B to the vehicle frame member 102. The biasing member 400 extends between the extension portion 122 and the vehicle frame member 102. Prior to a collision event, with the sealing device 108B in a pre-collision state, the extension portion 122 is spaced apart from the vehicle frame member 102 by a distance D5. In some embodiments, the biasing member 400 is a spring, such as a coil spring, or an elastomeric material.

Figure 4B:
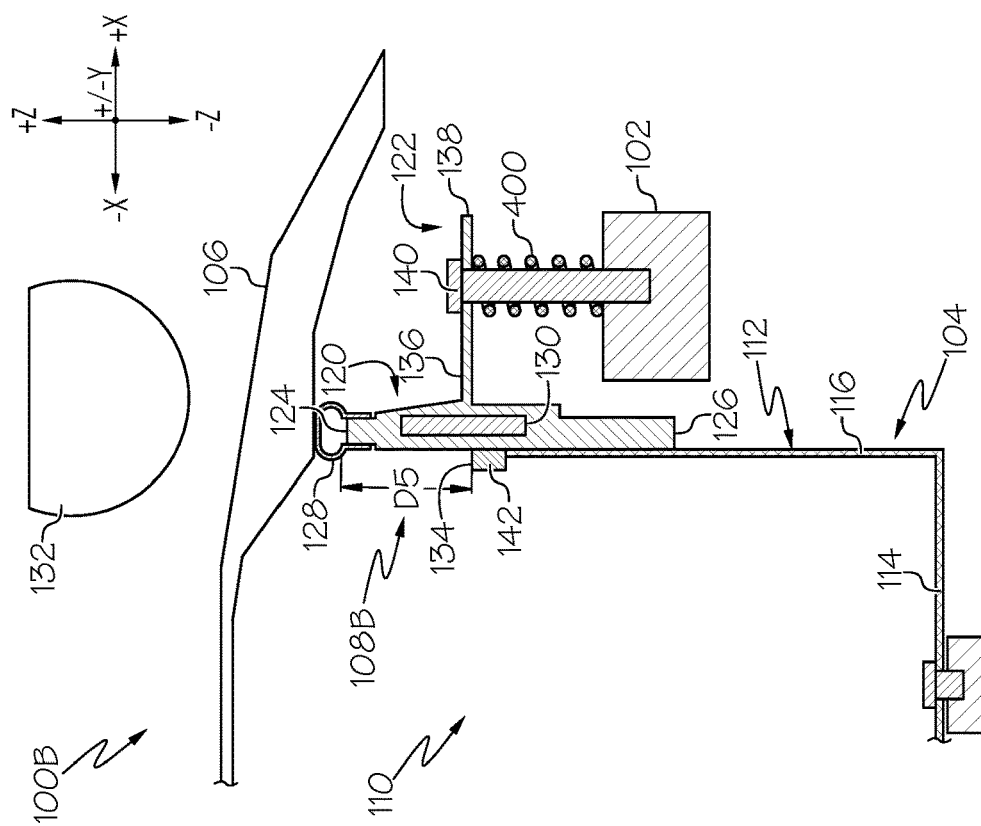
FIG. 4B schematically depicts a partial cross-sectional view of the vehicle of FIG. 4A including the sealing device of FIG. 4A in a collision state after a collision event, according to one or more embodiments shown and described herein.

As shown in FIG. 4B, after the collision event in which the object 132 applies a force against the upper end 124 of the frangible portion 120 of the sealing device 108B in the downward vehicle vertical direction, the biasing member 400 compresses to allow the sealing device 108B, specifically the extension portion 122, to travel along the fastener 140 in a direction of arrow C such that a distance D6 between the extension portion 122 and the vehicle frame member 102 is less than the distance D5 (FIG. 4A). Once the force applied against the upper end 124 of the frangible portion 120 is removed, the biasing member 400 applies a return force against the extension portion 122 to move the sealing device 108B in an opposite upward vehicle vertical direction so that the sealing device 108B may be reused.

From the above, it is to be appreciated that defined herein is a sealing device that couples a storage compartment to a vehicle frame member. The sealing device includes a seal for preventing fluid from entering the storage compartment. Upon a force exceeding a threshold being applied against an upper end of the sealing device during a collision event as an object impacts a vehicle body member above the sealing device, at least a portion of the sealing device moves in a downward vehicle vertical direction to increase a stroke permitted to travel by the object to mitigate an impact force on the object.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a vehicle frame member;
   a storage compartment; and
   a sealing device coupling the storage compartment to the vehicle frame member,
   wherein at least a portion of the sealing device is configured to move in a downward vehicle vertical direction upon a force exceeding a predetermined threshold being applied against an upper end of the sealing device.

2. The vehicle of claim 1, wherein at least a portion of the sealing device disengages the vehicle frame member upon the force exceeding the predetermined threshold being applied against an upper end of the sealing device in a downward vehicle vertical direction.

3. The vehicle of claim 2, further comprising a vehicle body member, wherein the sealing device comprises a seal provided at the upper end of the sealing device, the seal forming a seal between the upper end of the sealing device and the vehicle body member.

4. The vehicle of claim 3, wherein the storage compartment is a frunk of the vehicle, and the vehicle body member is a hood of the vehicle.

5. The vehicle of claim 3, wherein the sealing device further comprises:
   a frangible portion coupled to the storage compartment, the seal provided at an upper end of the frangible portion; and
   an extension portion having a proximal end and a distal end opposite the proximal end, the proximal end of the extension portion extending from the frangible portion and coupled to the vehicle frame member at the distal end of the extension portion.

6. The vehicle of claim 5, wherein the vehicle frame member includes a fastener and the distal end of the extension portion engages the fastener.

7. The vehicle of claim 6, wherein an open-ended cutout is formed in the distal end of the extension portion, the open-ended cutout permitting the extension portion to disengage the fastener upon the frangible portion moving in the downward vehicle vertical direction.

8. The vehicle of claim 6, wherein a weakened portion is formed proximate the proximal end of the extension portion, the weakened portion permitting the extension portion to break at the weakened portion upon the frangible portion moving in the downward vehicle vertical direction.

9. The vehicle of claim 8, wherein the weakened portion is a groove extending in a lateral direction between opposite sides of the extension portion.

10. The vehicle of claim 8, wherein the weakened portion is an opening formed in the extension portion.

11. The vehicle of claim 8, wherein the weakened portion is at least one notch formed in opposite sides of the extension portion.

12. The vehicle of claim 5, wherein the sealing device further comprises an inner reinforcement member encased within the frangible portion, the inner reinforcement member formed of a first material, the frangible portion formed of a second material different from the first material.

13. The vehicle of claim 12, wherein a height of the inner reinforcement member extending along a vehicle vertical axis is greater than a thickness of the inner reinforcement member extending along an axis transverse to the vehicle vertical axis.

14. The vehicle of claim 1, further comprising a bracket coupling the sealing device to the vehicle frame member, the bracket being deformable upon the force exceeding the predetermined threshold being applied against the upper end of the sealing device to permit at least a portion of the sealing device to move in the downward vehicle vertical direction.

15. The vehicle of claim 1, further comprising:
   a fastener slidably coupling the sealing device to the vehicle frame member; and
   a biasing member provided on the fastener between the sealing device and the vehicle frame member,
   wherein the biasing member compresses upon the force exceeding the predetermined threshold being applied against the upper end of the sealing device to permit at least a portion of the sealing device to move in the downward vehicle vertical direction.

16. The vehicle of claim 1, further comprising a sealing device attachment frame provided on the storage compartment, the sealing device removably attached to the sealing device attachment frame.

* * * * *